United States Patent [19]
Kolpak et al.

[11] Patent Number: 5,209,765
[45] Date of Patent: May 11, 1993

[54] CENTRIFUGAL SEPARATOR SYSTEMS FOR MULTI-PHASE FLUIDS

[75] Inventors: Miroslav M. Kolpak; Steven G. Petermann, both of Plano, Tex.

[73] Assignee: Atlantic Richfield Company, Los Angeles, Calif.

[21] Appl. No.: 697,148

[22] Filed: May 8, 1991

[51] Int. Cl.$^5$ ............................................. B01D 19/00
[52] U.S. Cl. ...................................... 55/168; 55/203; 55/206; 55/345; 55/459.1; 210/562.2
[58] Field of Search ................. 55/167, 168, 202, 203, 55/204, 206, 344, 345, 399, 459.1; 210/512.2

[56] References Cited

U.S. PATENT DOCUMENTS

| | | | |
|---|---|---|---|
| 2,590,754 | 3/1952 | Cline | 55/204 |
| 2,794,832 | 6/1957 | Rietema | 210/512.2 X |
| 3,595,298 | 7/1971 | Enders | 55/203 X |
| 3,641,745 | 2/1972 | Moore | 55/345 |
| 3,895,930 | 7/1975 | Campolong | 55/399 X |
| 4,201,555 | 5/1980 | Tkach | 55/204 X |
| 4,559,068 | 12/1985 | Lagerstedt et al. | 55/399 X |
| 4,673,495 | 6/1987 | Carroll et al. | 55/345 X |
| 4,852,395 | 8/1989 | Kolpak | 73/61.1 R |

Primary Examiner—Charles Hart
Attorney, Agent, or Firm—Michael E. Martin

[57] ABSTRACT

Gas-liquid mixtures, such as produced from crude oil reservoirs, are separated in a separator system having a separator vessel with a spiral inlet duct for centrifuging the gas-liquid mixture and an active centrifuge for removing entrained gas after primary separation by the spiral inlet duct. Active centrifuging is carried out by a rotating member disposed in a second compartment in the separator vessel having a plurality of circumferentially-spaced, radially-extending chambers for imposing centrifugal force on a quantity of liquid in each chamber. The chambers may discharge liquid through a porous outer cylindrical wall or through axially disposed discharge ports. The plural chambers minimize remixing of gas and liquid during centrifuging. The centrifuge may be an external rotary-tube type centrifuge with plural separator chambers. The centrifuge may also include a pump connected to the separator liquid discharge line for reintroducing a portion of the liquid into a secondary space in the separator vessel in a centrifugal flow path to further force gas-liquid separation through centrifugal forces acting on the mixture.

27 Claims, 5 Drawing Sheets

CENTRIFUGAL SEPARATOR SYSTEMS FOR MULTI-PHASE FLUIDS

BACKGROUND OF THE INVENTION

1. Field of the Invention

The present invention pertains to active centrifugal separator systems for separating entrained gas from liquids, particularly useful in metering crude oil production.

2. Background

In the production of crude oil, and the processing of certain other gassy liquids, it is necessary or at least desirable to perform separation processes to separate the gas from the liquid phase of the mixture. Such processes are usually carried out to retain the gas for other uses and to more accurately determine the flow rate and composition of the liquid flowstream. Such processes are particularly useful in the production of crude oil whereby separation of the liquid phase from the gas phase is important for further handling and for accurate measurement of production from each well or a group of wells.

U.S. Pat. No. 4,852,395 to Miroslav M. Kolpak and assigned to the assignee of the present invention describes a flow measuring system of a type particularly suited for measuring crude oil production. This patent describes one type of a so-called "passive" centrifugal separator wherein a gassy liquid flowstream is conducted into a separator vessel through a tangential inlet conduit and centrifugal flow is induced to effect separation of a substantial amount of gas from the liquid phase. The system described in the '395 patent does, however, require the use of a device for measuring the residual gas content of the liquid flowstream to more accurately gauge the flow rate and composition of the liquid.

An alternate approach is to more thoroughly separate the gas phase from the liquid phase prior to liquid flow measurement and measurement of the water content of the liquid phase. The present invention is directed to several embodiments of a system which provides improved gas-liquid separator devices, particularly adapted for measuring the flow rate of gas-liquid flowstreams encountered in production of crude oil and the like.

SUMMARY OF THE INVENTION

The present invention provides an improved system for separating gas from a gassy liquid flowstream such as typically encountered in producing crude oil from underground reservoirs. In accordance with an important aspect of the present invention, there are provided several embodiments of active centrifugal separator devices which are advantageously used in combination with a primary separator device to thoroughly separate entrained gas from a gas-liquid mixture whereby the liquid phase may be accurately measured by conventional flowmeters and without requiring further devices for determining the gas content of the liquid flowstream.

The present invention advantageously provides a system for separating gas from a gas-liquid mixture and for measuring the flow rate and composition of the liquid mixture wherein a primary separator vessel is provided, in combination, with an active centrifugal separator which isolates predetermined quantities of a gas-liquid mixture and separates the gas from the liquid without a tendency to remix or agitate the liquid in a way which would re-entrain the gas.

In accordance with another embodiment of the present invention, there is provided a gas-liquid separation and flow measuring system wherein a mechanical centrifugal separator or centrifuge is contained within a separator vessel which also performs centrifugal separation through induction of a multi-phase flowstream. In particular, a centrifuge is provided in the form of a porous drum which shields the rotating fluid from turbulence in the shear zone between the drum and the outer wall of the separator vessel while simultaneously allowing the rotating fluid body to move radially toward and through the drum circumferential wall.

Still further in accordance with the present invention, there is provided a gas-liquid separator system which includes a rotatable centrifugal separator characterized by plural circumferentially and radially spaced chambers which, when the mixed phase flowstream enters the chambers, provides efficient separation of liquid from gas without the likelihood of remixing of the gas and liquid and wherein the separated gas is required to move only a short distance with respect to the liquid before final separation is accomplished.

In accordance with yet a further aspect of the present invention, there is provided a unique centrifugal separator of the type mentioned hereinabove which provides for effective gas-liquid separation in a compact device which may be incorporated in a gas-liquid separator vessel.

Still further in accordance with the present invention, there is provided a two-stage gas-liquid separator system wherein a gas-liquid mixture is introduced tangentially into a separator vessel having two separation chambers. External pump means is provided to accelerate the gas-liquid flowstream after primary separation and for reintroduction into the separator vessel to accomplish secondary separation. The last-mentioned arrangement may include a non-powered rotating drum within the separator vessel to enhance and maintain separation of gas from liquid.

Those skilled in the art will recognize the abovedescribed features and advantages of the present invention, together with other superior aspects thereof, upon reading the detailed description which follows in conjunction with the drawing.

DESCRIPTION OF PREFERRED EMBODIMENTS

Figures 1, 2:
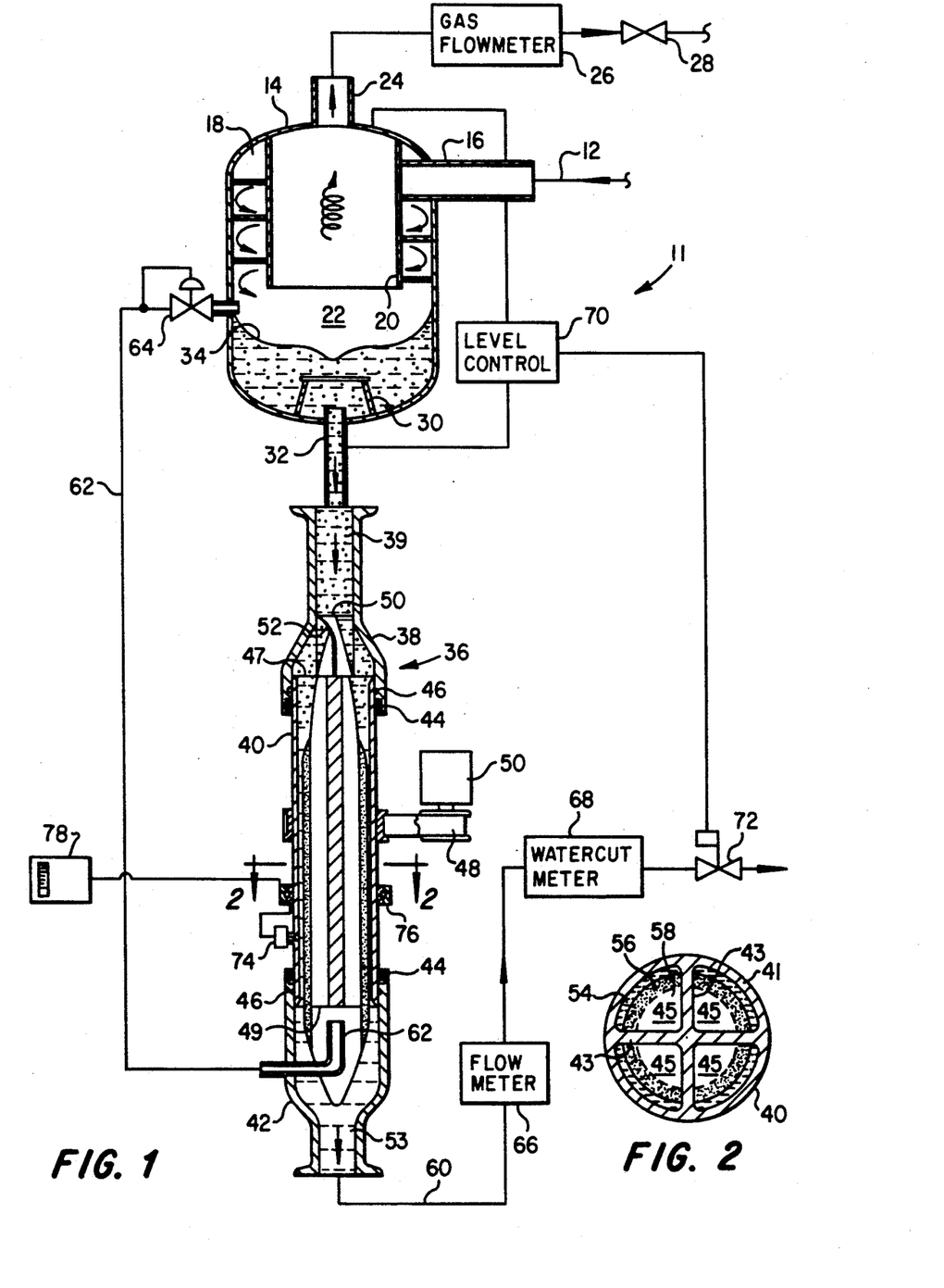
FIG. 1 is a schematic diagram of an improved gas-liquid separator and flow measurement system in accordance with the present invention.
FIG. 2 is a section view taken along the line 2—2 of FIG. 1.

In the description which follows, like parts are marked throughout the specification and drawing with the same reference numerals, respectively. The drawing figures are not necessarily to scale, and the various views may include elements which are shown in scaled and detailed form, together with elements which are shown generally schematically. Referring to FIG. 1, there is illustrated a system 11 for separating gas from a gas-liquid mixture and including means for measuring the flow rate and composition of the liquid mixture, in particular. The system 11 receives a gas-liquid mixture, which may be a source such as a crude oil production well, not shown, by way of a conduit 12 which is connected to a primary separator vessel 14. The vessel 14 is of generally cylindrical construction and includes a tangential inlet conduit 16 which injects the gas-liquid mixture into a spiral duct 18 defined in part by a generally cylindrical inner shell member 20. The separator vessel 14 is similar to that which is described in U.S. Pat. No. 4,852,395 and includes a space 22 in which substantial separation of gas from liquid occurs. Gas flows from the space 22 through a gas discharge conduit 24, typically to a gas flowmeter 26. A pressure control valve 28 is preferably interposed in the conduit 24 to regulate the pressure in the space 22 and the gas flow rate, accordingly. The separator vessel 14 further includes a vortex breaker 30 disposed in the space 22 above a liquid outlet conduit 32 to minimize entraining gas into the liquid flow leaving the vessel 14. The liquid level in the vessel 14 is indicated by the line 34 below which is a liquid with some entrained gas remaining.

The conduit 32 is connected to a unique centrifugal separator apparatus generally designated by the numeral 36. The apparatus 36 is similar in some respects to a commercially available liquid-to-liquid separator manufactured under the trademark Dynaclean by Serck Baker, Huntington Beach, Calif. However, the separator 36 is unique in several respects, as will be described herein. The separator 36 includes a combination inlet conduit and support housing 38 for supporting one end of a centrifuge comprising a rotating tubular separator member 40. The separator member 40 is supported at its opposite end by a combination discharge conduit and support housing 42. The housings 38 and 42 are suitably supported stationary with respect to the separator vessel 14, for example, and are provided with suitable bearings 44 and seals 46 for rotatably supporting the housing 40 and to prevent the leakage of fluid from the interior of the separator 36.

The separator member 40 is rotatably driven through suitable drive means such as a belt drive 48 operably driven by a motor 50. The separator member 40 is characterized as a generally cylindrical tube having a cylindrical outer wall 41 and a plurality of radially projecting divider members 43, see FIG. 2 also, which divide the interior of the member 40 into plural, elongated separator chambers or cells 45. The end 47 of the separator member 40 disposed in the support housing 38 is provided with a flow inducer 50 having a plurality of circumferentially spaced and curved flow-inducing vanes 52 which guide the flowstream into the chambers 45 and minimize turbulence and agitation of the fluid entering the chambers from the interior 39 of the conduit and support member 38. By providing the separator member 40 to have the separate separation chambers 45, a quantity of liquid with gas entrained therein passing through the chambers from the end 47 to the interior space 53 of the member 42 will be subjected to centrifugal force without a significant amount of shearing action between the inner wall surface of the tube 41 and the fluid so that centrifugal force will tend to separate the fluid into a liquid layer 54, FIG. 2, of the most dense liquid, a second liquid layer 56 of less dense liquid and a space 58 occupied by gas within each chamber. The separation of gas and liquid will be substantially maintained even as the separated flowstreams exit the lower end 49 of the separator member, although re-mixing of the liquids will occur as the liquid flowstream exits the member 42 through an outlet conduit 60.

Accordingly, a gas outlet conduit 62 is interposed in the space 53 within the member 42 to draw off the separated gas whereby it may be reinjected into the space 22 of the separator 14 for flow to the meter 26. A pressure regulator valve 64 is preferably interposed in the conduit 62 to regulate the gas pressure therein. The flow inducer 50 and the centrifugal separator member 40 will typically generate a pressure rise in the flowstream between the end 47 and the end 49 of the separator member.

The system 11 further includes a liquid flowmeter 66 and a meter 68 for determining the composition of the liquid, in particular, determining the water content of water-oil mixture exiting the separator 36. The flow through the system 11 is controllable by a level controller or sensor 70 which is operably connected to a flow control valve 72 so that a predetermined liquid level, as determined by the interface 34, resides in the space 22.

Another advantageous aspect of the centrifugal separator 36 is characterized by an acoustic signal generator and receiver 74 which is mounted on the tube 41 and is operable to beam an acoustic signal radially inwardly into a chamber 45 to measure the radial thickness of the water or most dense liquid layer 54. Assuming a substantially uniform circumferential thickness of the water layer 54, as indicated by the drawing FIG. 1, and an average flow velocity is determinable, the measured thickness may be converted into a measurement of the oil content of the flowstream. For example, if total liquid flow rate is known from the flowmeter 66 and an assumed instantaneous volume of water in the tube 40 at any given time as measured by the water layer thickness, multiplied by the number of chambers 45 and the length of the tube 41 with a correction factor for the thickness at the induction point, then the water content of the total flow may be calculated. The signal output from the transducer 74 is preferably conducted to a slipring assembly 76 so that a reading may be taken at a suitable readout console 78.

The operation of the system 11 is believed to be understandable from the foregoing description. However, briefly, substantial amounts of gas are separated from a liquid flowstream by introducing the flowstream through the conduit 12 for primary separation within the separator vessel 14. Liquid with some residual gas is then introduced into the centrifugal separator 36, the active member 40 of which is being rotatably driven at a predetermined speed by the motor 50 to form the separate layers 54, 56 and 58 of the fluids present in the flowstream. Gas exiting the lower end 49 of the member 40 is drawn off by the conduit 62 and introduced into the space 22 for exit through the conduit 24 for subsequent flow rate measurement. The liquid flowstream is conducted by way of conduit 60 through the meters 66 and 68. The control valve 72 is continuously adjusted to maintain a substantially predetermined level of liquid in the space 22. The motor 50 may require speed adjustment to compensate for changes in flow rate of the fluidstream entering the separator 36 to provide sufficient separation of the fluid phases in the flowstream. Control of motor speed 50 also adjusts the flowstream rate since the inducer 50 acts somewhat as a pump.

Figure 3:
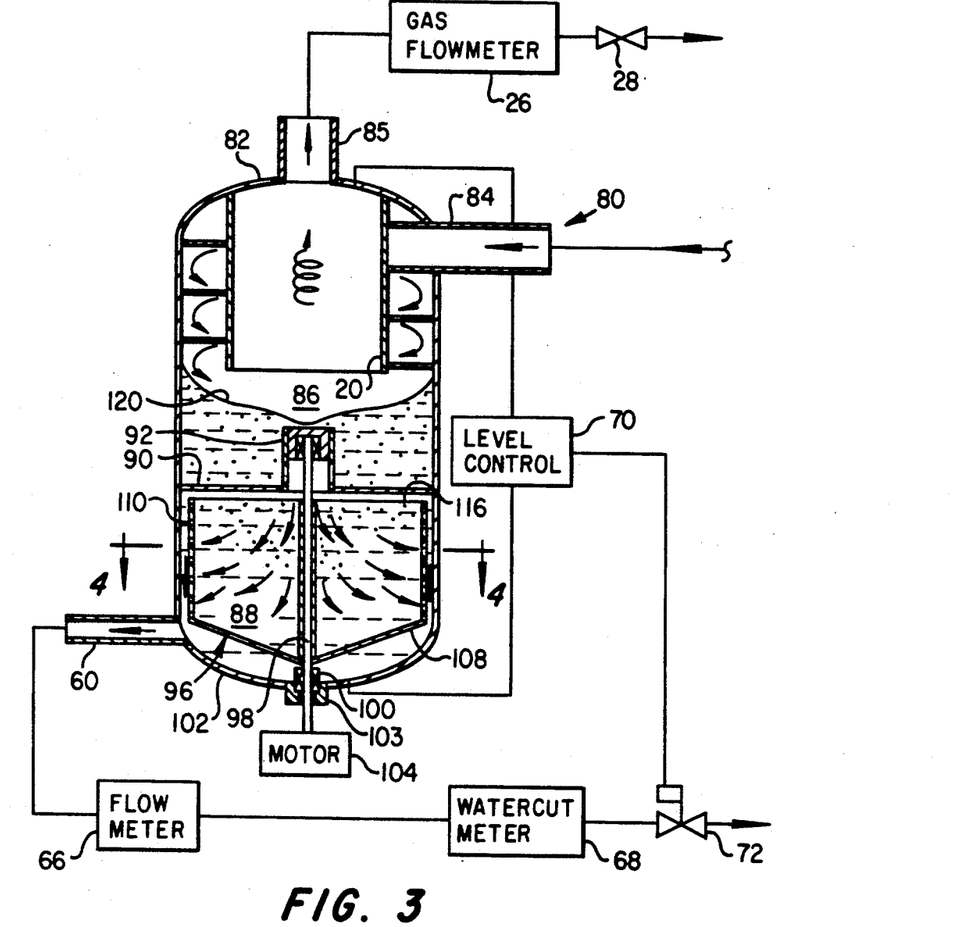
FIG. 3 is a schematic diagram of a first alternate embodiment of the present invention.
Figure 5:
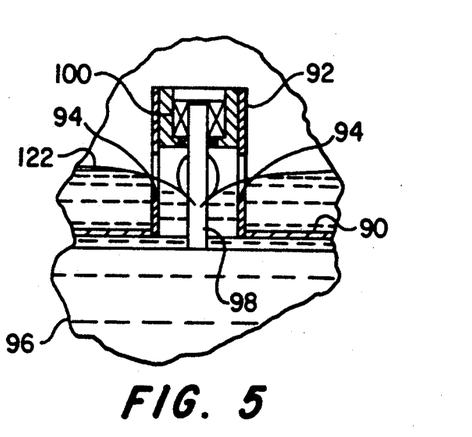
FIG. 5 is a detail view showing the weir of the separator of FIG. 3 on a larger scale.

Referring now to FIG. 3, an alternate embodiment of a system in accordance with the present invention is illustrated and generally designated by the numeral 80. The system 80 includes several components similar to those used in the system 11. However, a significant difference provided by the system 80 includes a modified separator vessel 82 having an inlet conduit 84, together with the spiral duct formed in part by the shell member 20 and an interior space which is divided into two compartments 86 and 88 by a transverse wall 90. The transverse wall 90 includes a central, axially-extending cylindrical hub portion 92 with radial openings 94 formed therein and forming a lower control edge or weir, see FIG. 5, also. The hub 92 also forms a bearing support for a centrifuge characterized by rotatable drum 96 disposed in the space 88 and including a central support shaft 98 suitably mounted on bearings 100 which are supported by the hub 92 and a lower end wall 102 of the vessel 82. A suitable drive motor 104 is connected to the shaft 98 for rotatably driving the drum 96 at a pre-selected speed.

Figure 4:
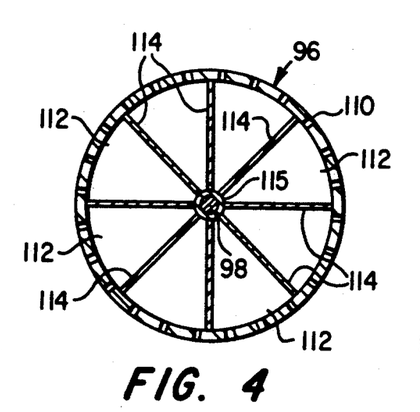
FIG. 4 is a section view taken along line 4—4 of FIG. 3.

Referring also to FIG. 4, the drum 96 includes a transverse bottom wall 108 and a porous peripheral side wall 110. The interior of the drum 96 is divided into a plurality of wedge-shaped chambers 112, delimited by radially extending baffles 114 and the peripheral porous wall 110. The top edge 116 of the drum 96 is open so that liquid may cascade through the ports or openings 94 and into the chambers 112 where, upon rotation of the drum, the fluids will separate due to centrifugal force acting thereon. Moreover, the radially extending baffles 114 minimize agitation of the fluid flowing into the chambers 112 so that separation of the gas from the liquid will occur and generally occupy a radially inner space surrounding a hub 115 for the support shaft 98. Gas collecting in the chambers near the hub 115 will tend to flow upward out of the drum and against the flow of liquid through the ports 94. In this way, gas separated by the drum 96 will flow back into the space 86 for eventual exit from the separator vessel by way of the a gas outlet conduit 85.

In FIG. 3, the liquid level in the space 86 is indicated by the interface line 120. This liquid level is controlled by a level controller 70 which is connected to a flow control valve 72 interposed in a discharge conduit 60 connected to the vessel 82 and in fluid flow communication with the space 88. The flowmeter 66 and watercut meter 68 are also interposed in this conduit in the same manner as with the system 11 illustrated in FIG. 1. Depending on the gas content of the liquid flowing through the vessel 82, the liquid level may be lowered to that illustrated in FIG. 5 and indicated by the interface line 122 whereby the escape of separated gas collecting in the compartments 112 may be easier.

The porous, peripheral wall 110 advantageously shields the rotating fluid in the chambers 112 from encountering turbulence in the space between the peripheral wall and the side wall of the vessel 82. Of course, the porous wall 110 permits the rotating quantities of liquid in each of the chambers 112 to move radially through the drum into the space between the wall 110 and the vessel side wall and then exit the space 88 through the conduit 60. The rotating drum 96 does, in fact, function to some extent as a centrifugal pump and may be configured such as to generate a moderate pressure increase in the fluid being forced through the conduit 60 from the vessel 82.

The drum 96 may be designed to rotate at a relatively slow speed, about 150–200 rpm, and have a significant outer wall porosity formed by many small holes, about 0.25 inches diameter, for example. Acceleration of the rotating gassy liquid volumes in the chambers 112 causes gas bubbles in the liquid to move toward the center of rotation or the shaft 98 and then upward to exit through the ports 94 and into the space 86. An example design for a separator drum for separating gas from a mixture of crude oil and water at the rate of about 25,000 barrels per day, assuming a nominal temperature of the gassy liquid of 100° F. and a nominal pressure in the separator space 86 of 150 psig, assumes that the drum 96 would rotate at about 150 rpm, would be of an overall height of about 4.0 ft. and an overall diameter of about 4.0 ft. The diameter of the hub 92 would be about 2.0 ft. A drum of this size would likely generate a pressure rise, acting like a centrifugal pump, of about 6.0 psi and require about 0.45 hp. The bearings 110 may or may not be of a sealed type. Unsealed bearings which are suitable for supporting the shaft 98 for rotation in liquids such as a mixture of water, crude oil and natural gas include a Type 701 sleeve bearing sold by Kennametal, Inc., Latrobe, Pa. Long-wearing rotary shaft seals such as those available from Kennametal, Inc. may be used for sealing the shaft at its point of exit from the bottom wall 102, such as at the hub 103. The motor 104 may be electric or hydraulic and suitably coupled to the shaft 98 in a conventional manner.

Operation of the system 80 is believed to be understandable to those of ordinary skill in the art based on the above description and the description of the operation of the system 11.

Figure 6:
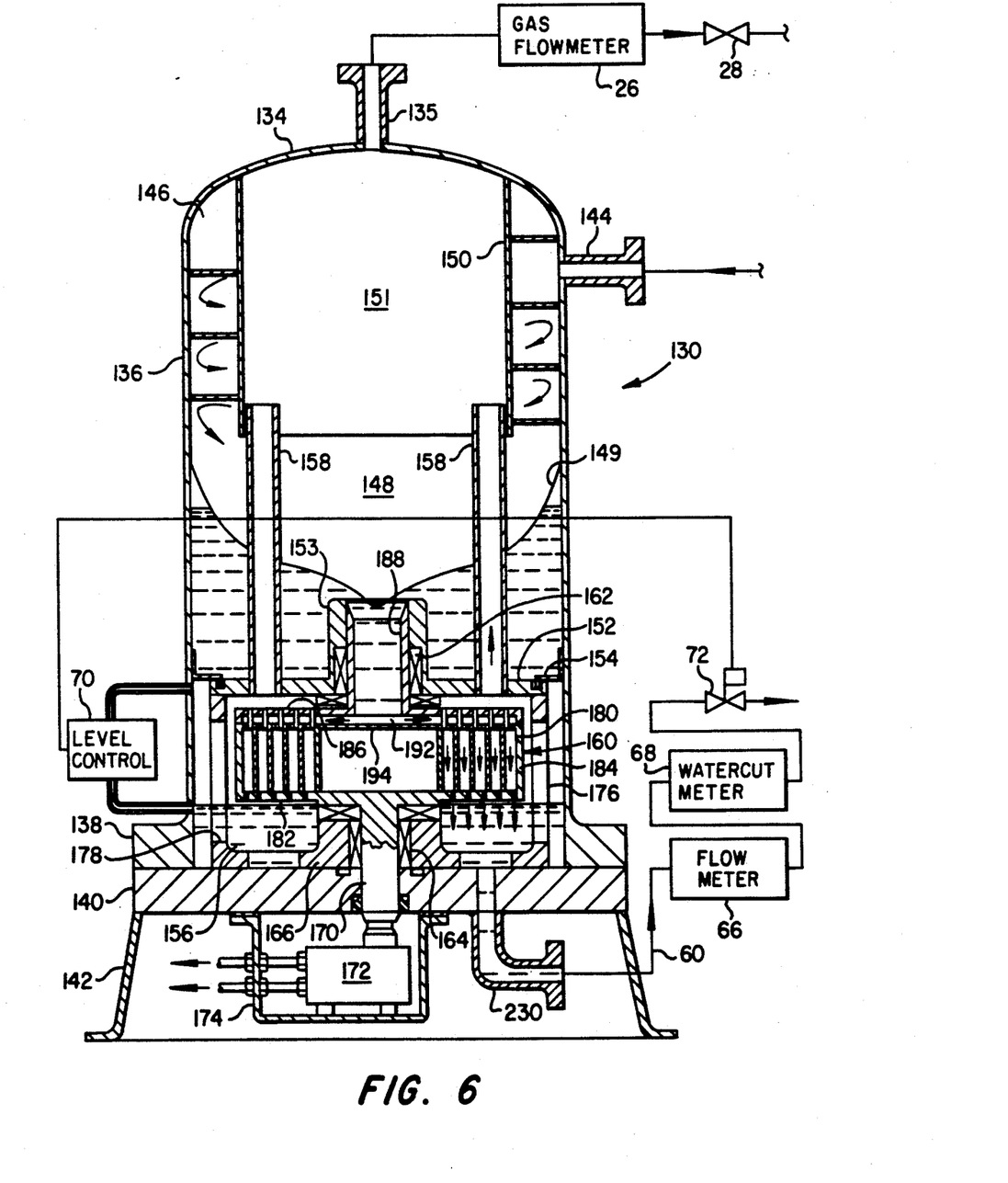
FIG. 6 is a schematic diagram of a second alternate embodiment of the present invention.
Figures 7, 8:
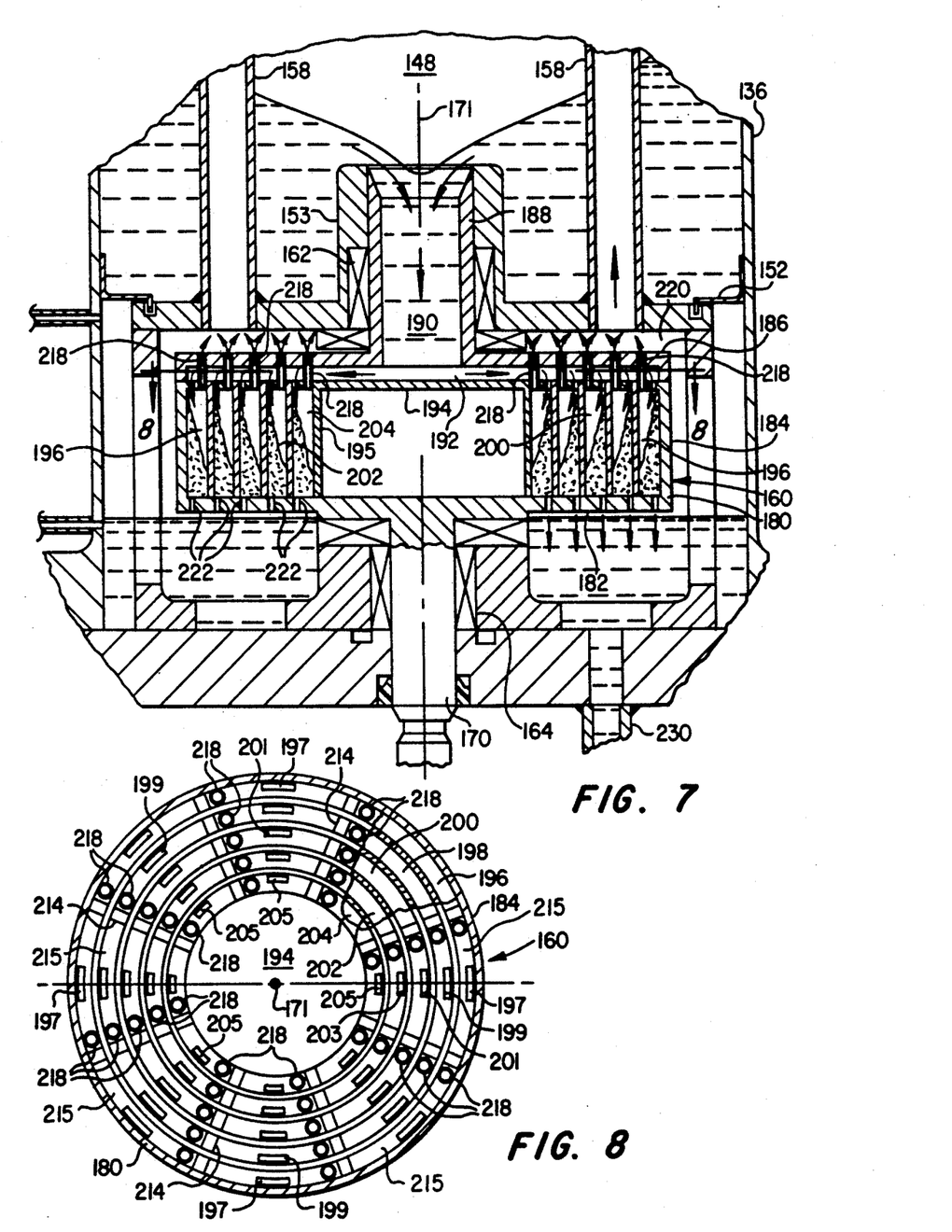
FIG. 7 is a detail view on a larger scale of a portion of the centrifugal separator illustrated in FIG. 6.
FIG. 8 is a view taken from the line 8—8 of FIG. 7.

Referring now to FIGS. 6, 7 and 8, and FIG. 6, in particular, there is illustrated another embodiment of a separation and measurement system in accordance with the present invention and generally designated by the numeral 130. The system 130 includes a separator vessel 132, which includes an active centrifuge apparatus, to be described in further detail herein. The separator vessel 132 includes a top end wall 134, a generally cylindrical side wall 136 and a bottom peripheral flange 138 which is adapted to be secured to a bottom end wall or end plate 140. The end plate 140 is suitably supported on a sub-frame 142, as illustrated in FIG. 6. A mixed-phase fluid inlet conduit 144 opens from the side wall 136 into a spiral duct 146 which, in turn, opens into a space 148. The duct 146 is defined in part by a depending cylindrical shell member 150. The space 148 is delimited, in part, by a transverse wall 152 which extends substantially across the interior space of the vessel 132 and, together with a peripheral inwardly-projecting flange 154, defines a partition between the space 148 and an interior space 156. The end wall 152 includes plural upwardly-extending, vent tubes 158 which are secured to the end wall 152 and extend generally upwardly into a space 151 enveloped by the member 150. The tubes 158 also open into the space 156 in which is rotatably supported a centrifuge, generally designated by the numeral 160. The centrifuge 160 is supported within the space 156 on spaced-apart bearings 162 and 164, respectively. The upper bearing 162 is supported within a hub portion 153 of the end wall 152, and the lower bearing 164 is supported by a hub 166 disposed on the lower end plate 140. The centrifuge 160 includes a depending drive shaft member 170 which extends through a suitable bore formed in the end plate 140 and is drivenly connected to a rotary motor 172 which may be of a hydraulic type as indicated in FIG. 6. The motor 172 is supported on a frame 174, as illustrated.

As shown further in FIG. 6, the transverse wall 152 is at least partly supported by a generally cylindrical frame 176 which includes the hub 166. Suitable openings 178 are formed in the frame 176 to form part of the cavity or space 156.

Referring now also to FIGS. 7 and 8, the centrifuge 160 is characterized by a generally cylindrical body member 180 having a transverse bottom wall 182 and a peripheral side wall 184. The shaft 170 extends downwardly from the bottom wall 182. The centrifuge 160 further includes a circular transverse top wall 186 coextensive with the peripheral side wall 184 and having a hollow stub shaft 188 extending upwardly therefrom and coaxial with the drive shaft 170. The stub shaft 188 is supported in the bearing 162 and extends to the distal end of the hub 153. An axially extending passage 190 extends through the stub shaft 188 and opens into a manifold space 192 formed between the top wall 186 and a central, generally circular hub part 194.

As shown in FIG. 8, the centrifuge 160 includes a plural sets of centrifuge chambers 196, 198, 200, 202 and 204 which are radially stacked and are separated from each other by a series of concentric, circular partitions 206, 208, 210, 212, including the side wall 195 of the hub 194 and the peripheral side wall 184. The chambers 196 through 204 are separated by radially-extending partitions 214 which extend between the hub wall 195 and the outer peripheral side wall 184. Each of the chambers 196 through 204 is in communication with a gas vent tube 218 which extends from a top transverse plate 215 delimiting each of the chambers, through the transverse wall 186 into an upper region 220 of the space 156 which is in communication with the gas vent tubes 158. Each of the chambers 196 through 204 is also in communication with the manifold space 192 by way of respective inlet ports 197, 199, 201, 203 and 205 formed in the plate 215.

Each of the chambers 196 through 204 is also in communication with the lower portion of the space 156 through respective liquid discharge ports 222, see FIG. 7. Liquid falling into the space 156 from the chambers 196 through 204 exits the space through a liquid discharge conduit 230, see FIG. 6. The conduit 230 is connected to the conduit 60 and the flowmeters 66 and 68 in the same manner as the previously-described embodiments of the present invention. The flow control valve 72 is connected to the level controller 70 which, in the system 130, controls the level of liquid in the space 156 to provide for the gas discharge space 220 at the upper portion thereof.

As shown in FIG. 7, the liquid discharge ports 222 for the centrifuge chambers 196 through 204 are positioned near the radially outermost portions of the chambers, respectively, whereas the gas vent tubes 218 are disposed generally radially inwardly with respect to each of the chambers 196 through 204. In the operation of the system 130, mixed-phase fluid flow enters the separator vessel 132 through the inlet conduit 144, and centrifugal flow, induced by the duct 146, achieves primary separation of liquid from gas which exits the separator vessel through the spaces 148, 151 and the gas discharge conduit 135 connected to a gas flowmeter 26. The nominal gas-liquid interface in the space 148 is indicated by the line 149 in FIG. 6 during operation of the system 130. The centrifuge 160 is rotatably driven by the motor 172 at a pre-selected speed while liquid is allowed to flow into the centrifuge through the passage 190, space 192 and the centrifuge chamber inlet ports 197, 199, 201, 203 and 205. In each of the chambers 196 through 204, centrifugal forces acting on the fluid entering the chambers tend to separate gas from liquid, forcing the liquid against the radially outermost wall of each chamber while allowing gas to collect in the radially innermost space of each chamber wherein the gas is vented upwardly from the respective chambers through the tubes 218 and liquid exits from the bottom of the centrifuge chambers through the respective liquid discharge ports 222. By providing a plurality of circular segment chambers 196 through 204, separated by the partitions 214 and disposed circumferentially about an axis of rotation 171, small portions of liquid are effectively subjected to centrifugal forces without substantial mixing and shearing action which would tend to remix or re-entrain gas bubbles in the liquid. Accordingly, an effective liquid-gas separation action occurs under the urging of centrifugal forces acting on the liquid as it passes into and through the respective separation chambers 196 through 204.

The operation of the system 130 just described is believed to be understandable to those skilled in the art when taking into consideration of the description of the system and the description of operation of the systems 11 and 80. One advantage of the centrifuge 60 and the system 130 is that by generating a plurality of relatively thin layers of liquid in each of the separation chambers 196 through 204, the gas bubbles entrained in the liquid layers need only move a relatively short distance to separate from the liquid. Accordingly, separation of gas and liquid is very efficient in the centrifuge 160. Although the chambers 196 through 204 are shown to have single gas and liquid exit ports, those skilled in the art will appreciate that a plurality of liquid as well as gas exit ports may be formed in the bottom and top walls defining the respective chambers. In other words, the bottom and top walls may be considered porous whereas in the configuration of the centrifuge in the system 130, the peripheral side wall is the porous member which permits the exit of liquid from the centrifuge itself.

Figures 9, 10:
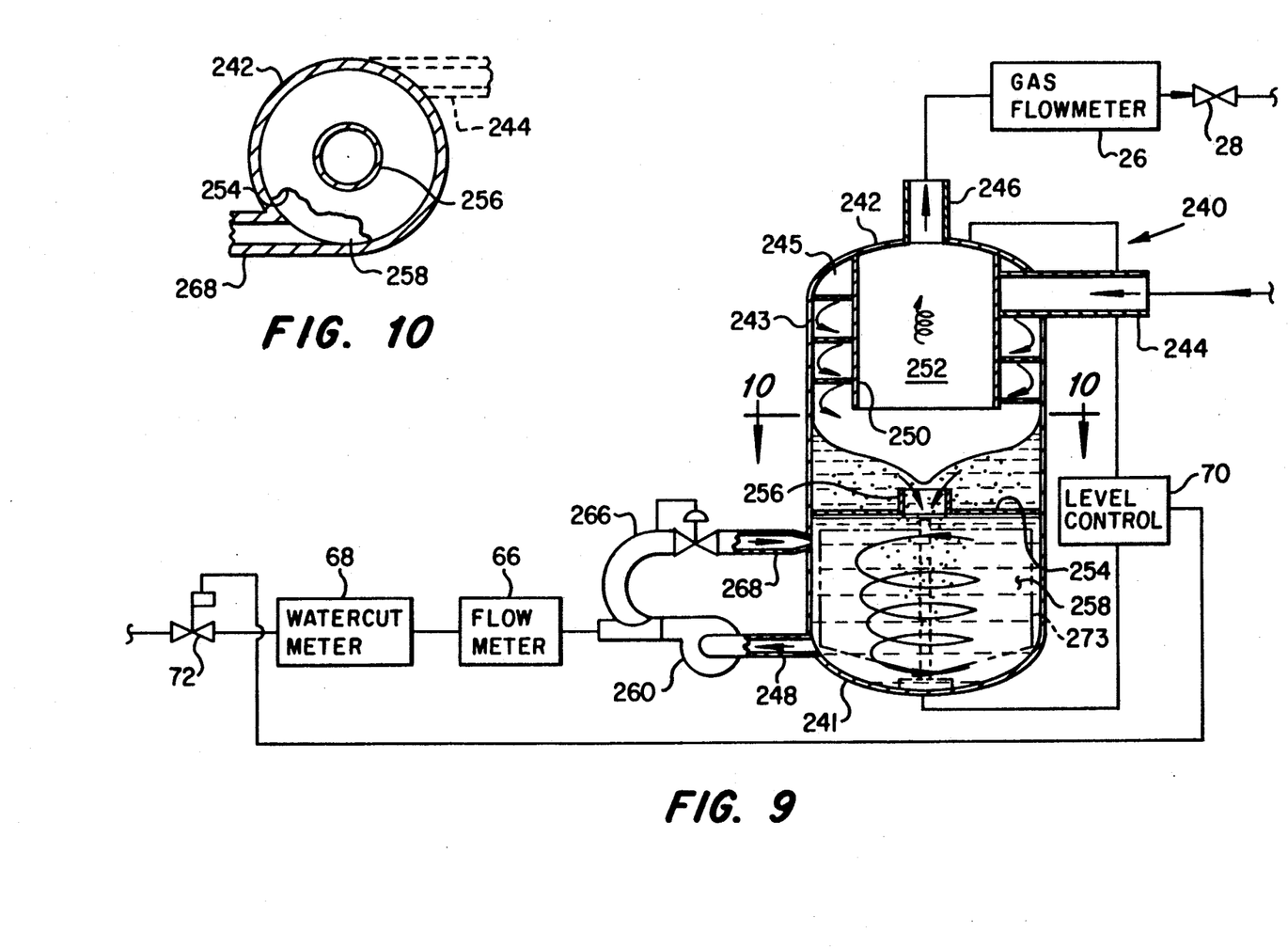
FIG. 9 is a schematic diagram of a third alternate embodiment of the present invention.
FIG. 10 is a detail section view taken from the line 10—10 of FIG. 9.

Referring now to FIGS. 9 and 10, a third alternate embodiment of the present invention is illustrated and generally designated by the numeral 240. The system 240 includes a generally cylindrical separator vessel 242 similar to the separator vessel 82 of the system 80. The vessel 242 includes a mixed-phase fluid inlet conduit 244, a gas discharge conduit 246 and a liquid discharge conduit 248 disposed generally at or adjacent a bottom wall 241 of the separator vessel. An interior spiral duct 245 is in communication with the conduit 244 and is defined in part by a generally cylindrical depending member 250 defining an interior space 252 for conducting gas to the conduit 246. The vessel 242 includes a transverse interior wall 254 having a central cylindrical upstanding weir 256 defining a passage between the space 252 and a space 258 formed in the lower portion of the vessel. The discharge conduit 248 is connected to a pump 260 which is operable to deliver substantially gas-free liquid to the flowmeters 66 and 68 and to the flow control valve 72 which is operably connected to a liquid level controller 70 in the same manner as the previous embodiments of the invention. The pump 260 is also operable to discharge a slipstream of liquid through a branch conduit 266 to a tangential inlet conduit 268 which is disposed with respect to the side wall 243 of the vessel 242 so as to induce a generally vortical or centrifugal flow of fluid in the space 258. As indicated in FIG. 10, the conduits 244 and 268 are arranged so as to be operable to induce flow of fluid within the spaces 252 and 258 in the same direction, counterclockwise viewing FIG. 10.

Accordingly, in the system 240, separation of gas from the liquid is induced by centrifugal flow through the spiral duct 245 and, after primary separation, a second centrifuging is induced by the pump 260 which forces some fluid back into the space 258. In this way, an accelerated centrifugal flow of liquid in the space 258 is provided with gas bubbles tending to collect in the center of the space and flow upward through the weir 256 into the space 252 for exit from the vessel 246 through the gas flowmeter 26 and a suitable gas flow control valve 28. One advantage of the system 240 is the lack of any mechanical devices within the space 258. However, a passively rotated separation drum may be disposed within the space 258 and responsive to the centrifugal flow of liquid being ejected into the space 268 to contribute to the separation of gas and liquid.

Operation of the system 240 is believed to be readily understandable to those of ordinary skill in the art from the foregoing description. Moreover, the vessel 242 may be separated into two separator vessels wherein the pump-induced centrifugal flow in the space 258 may be carried out in a vessel which is physically separate from the vessel 242. The pump may be of the magnetically-coupled type wherein no external shaft seal is required for the pump. Moreover, the separator 242 enjoys the same advantages as the separator 14 in not having any external mechanical drive members penetrating the separator wall and forming a potential leakage path. A freewheeling separator member 273, similar to the member 96, may be disposed in the space 253 and rotatably propelled by the fluid introduced into the space from the conduit 268. Advantages of the system 240 which are shared by all of the systems described above reside in the simplified metering and separation of gas from liquid by a relatively compact separator system. Moreover, the systems described all at least moderately increase the pressure of the liquid flowing out of the separator system to compensate for pressure drops caused by pipe friction in the separator system and by the flowmeters 66 and 68, for example.

The materials and components used for construction of the separator systems described above, which have not been specifically described, may be comprised of conventional engineering materials and elements. Although preferred embodiments of the present invention have been described in detail herein, those skilled in the art will recognize that various substitutions and modifications may be made without departing from the scope and spirit of the invention as recited in the appended claims.

What is claimed is:

1. A system for separating liquid from a gas-liquid mixture in oil well production comprising:
    a separator vessel for receiving a gas-liquid mixture from a production flowstream and including means for effecting primary separation of at least a portion of gas entrained in said mixture from said liquid, said vessel having a gas-liquid mixture inlet conduit, a gas outlet conduit and liquid outlet means; and
    centrifuge means connected to said vessel for receiving liquid from said liquid outlet means and for imposing centrifugal forces on said liquid to cause substantially radial outward flow of liquid and separation of gas remaining entrained in said liquid after said primary separation to provide a substantially gas-free liquid flowstream for measurement of at least one of composition and flow rate of said liquid, said centrifuge means including a rotating centrifuge member having a plurality of separation chambers formed therein for imposing centrifugal forces on liquid to force liquid radially outward in said chambers while permitting gas to remain radially inward of said liquid and without substantial intermixing of gas and liquid in said chambers.

2. The system set forth in claim 1 wherein:
    said centrifuge member includes an elongated, tubular member supported for rotation with respect to opposed support members and having an inlet end and a discharge end, and wherein at least one of said support members includes means for conducting gas from said chambers during rotation of said centrifuge member.

3. The system set forth in claim 1 wherein:
    said chambers are formed substantially as segments of a circle by an outer wall of said centrifuge member and plural radially extending partition means.

4. The system set forth in claim 1 including:
    means on said centrifuge member for measuring the thickness of a liquid layer in at least one of said chambers.

5. The system set forth in claim 1 including:
    a flowmeter for measuring the flow rate of liquid leaving said vessel and meter means for determining the composition of said liquid after removal of said entrained gas.

6. The system set forth in claim 1 including:
    a fluid level controller connected to said vessel and to valve means interposed in a liquid discharge conduit for controlling the level of liquid in said vessel.

7. A system for separating liquid from a gas-liquid mixture in oil well production comprising:
    a separator vessel for receiving a gas-liquid mixture from a production flowstream and including means for effecting primary separation of at least a portion of gas entrained in said mixture from said liquid, said vessel having a gas-liquid mixture inlet conduit, a gas outlet conduit and liquid outlet means; and
    centrifuge means for imposing centrifugal forces on said liquid to cause substantially radial outward flow of liquid and separation of gas remaining entrained in said liquid after said primary separation to provide a substantially gas-free liquid flowstream for measurement of at least one of composition and flow rate of said liquid, said centrifuge means including a rotatable centrifuge member disposed in a space in said vessel, said centrifuge member including a generally cylindrical peripheral outer wall and a plurality of chambers defined at least in part by said outer wall, each of said chambers being adapted to receive liquid, and said centrifuge member is operable to impart centrifugal force to liquid in each of said chambers to force said liquid toward said outer wall to separate said liquid from gas entrained therein.

8. The system set forth in claim 7 wherein:
said centrifuge member is rotatably driven by motor means.

9. The system set forth in claim 7 wherein:
said centrifuge member is rotatably driven by pressure fluid impinging thereon.

10. The system set forth in claim 7 wherein:
said outer wall is porous whereby liquid exits said centrifuge member through each of said chambers and said outer wall.

11. The system set forth in claim 10 wherein:
said vessel includes partition means for defining a first space and a second space, said centrifuge member being disposed in said second space.

12. The system set forth in claim 11 including:
means defining a weir for discharging liquid from said first space into said second space.

13. The system set forth in claim 11 wherein:
said vessel includes gas vent conduit means in communication with said second space for conducting gas from said centrifuge member to said first space for discharge from said vessel.

14. The system set forth in claim 7 wherein:
said centrifuge member comprises a plurality of radially spaced-apart chambers for receiving a gas-liquid mixture, said chambers including gas-liquid mixture inlet means, gas discharge means and liquid discharge means for separating gas from liquid in response to rotation of said centrifuge member.

15. The system set forth in claim 14 wherein:
said centrifuge member includes shaft means rotatably connected to a drive motor, means forming an inlet manifold for communicating a gas-liquid mixture to said mixture inlet means and inlet passage means in communication with said manifold.

16. The system set forth in claim 15 wherein:
said inlet passage means is formed in a support shaft of said centrifuge member in communication with said first space.

17. A system for separating liquid from a gas-liquid mixture in oil well production comprising:
a separator vessel for receiving a gas-liquid mixture from a production flowstream and including means for effecting primary separation of at least a portion of gas entrained in said mixture form said liquid, said vessel having a gas-liquid mixture inlet conduit, a gas outlet conduit and liquid outlet means; and
centrifuge means for imposing centrifugal forces on said liquid to cause substantially radial outward flow of liquid and separation of gas remaining entrained in said liquid after said primary separation to provide a substantially gas-free liquid flowstream for measurement of at least one of composition and flow rate of said liquid, said centrifuge means including a rotary centrifuge including spaced-apart support members, said support members including respective inlet and discharge conduit portions and means for supporting a rotatable centrifuge member, a rotatable centrifuge member supported on said support members for rotation relative thereto and comprising an elongate tube having plural elongated chambers formed therein and open to opposite ends of said tube for receiving a liquid flowstream at one end and for discharging separate gas and liquid flowstreams at the opposite end, and conduit means for receiving said gas flowstream for discharging a separated gas flowstream from said centrifuge means.

18. A separator for separating gas entrained in a gas-liquid mixture comprising:
a vessel, including an interior partition for dividing said vessel into a first space and a second space;
means in said first space for receiving a gas-liquid mixture and for providing primary separation of gas entrained in said gas-liquid mixture; and
a centrifuge member disposed in said second space for receiving liquid from said first space for separating further amounts of gas entrained in said liquid, said centrifuge member being rotatably supported in said second space and including a plurality of radially extending chambers formed in said centrifuge member for receiving a quantity of liquid with gas entrained therein, means for discharging liquid from said centrifuge member in one direction and means for discharging gas from said centrifuge member in another direction for separating gas from liquid in said chambers.

19. The separator set forth in claim 18 wherein:
said centrifuge member includes a circumferential outer wall defining at least in part each of said chambers and said outer wall includes means for discharging liquid from said chambers to said second space.

20. The separator set forth in claim 18 wherein:
said centrifuge member includes a plurality of radially and circumferentially spaced chambers formed therein, means for communicating a gas-liquid mixture to said chambers, means for venting gas from each of said chambers, means for discharging liquid from each of said chambers, and means drivably connected to said centrifuge member for rotating said centrifuge member to separate gas from liquid in each of said chambers.

21. The separator set forth in claim 20 wherein:
said centrifuge member includes means forming a liquid inlet passage in communication with said first space and with each of said chambers for conducting liquid to said chambers for separation of gas entrained in said liquid.

22. The separator set forth in claim 21 wherein:
said means forming said passage includes shaft means for supporting said centrifuge member in said second space.

23. The separator set forth in claim 20 including:
motor means drivably connected to said centrifuge member for rotatably driving said centrifuge member to effect separation of gas from liquid disposed in said chambers.

24. A separator for separating gas from a gas-liquid mixture, comprising:
a vessel including means defining an enclosed space, gas discharge conduit means in communication with said space, liquid discharge conduit means in communication with said space, a centrifuge member disposed in said space and means for conducting a gas-liquid mixture to said centrifuge member, said centrifuge member including means defining a plurality of circumferentially-spaced chambers formed therein and means for supporting said centrifuge member for rotation in said vessel, means forming gas discharge passages in communication with said chambers and means forming liquid discharge passages in communication with said chambers, said centrifuge member being operable to receive a gas-liquid mixture in each of said chambers whereby a quantity of gas-liquid mixture is subjected to centrifugal force in each chamber to separate liquid from gas for discharge from each chamber through said gas discharge means and said liquid discharge means, respectively.

25. The separator set forth in claim 24 wherein:
said centrifuge member includes shaft means for supporting said centrifuge member for rotation in said vessel and said means for conducting comprises a passage formed in said shaft means.

26. The separator set forth in claim 24 wherein:
said gas discharge passages are formed by conduit means disposed radially inwardly of said liquid discharge passages with respect to an axis of rotation of said centrifuge member.

27. The separator set forth in claim 24 wherein:
said centrifuge member includes a plurality of radially spaced chambers for receiving said gas-liquid mixture, each of said radially spaced chambers including a gas-liquid mixture inlet means, a gas discharge passage and a liquid discharge passage, respectively.

* * * * *